Nov. 24, 1953  A. A. MEDDOCK  2,660,456
AUTOMATIC QUICK DISCONNECT COUPLING
Filed Dec. 28, 1948  2 Sheets-Sheet 1
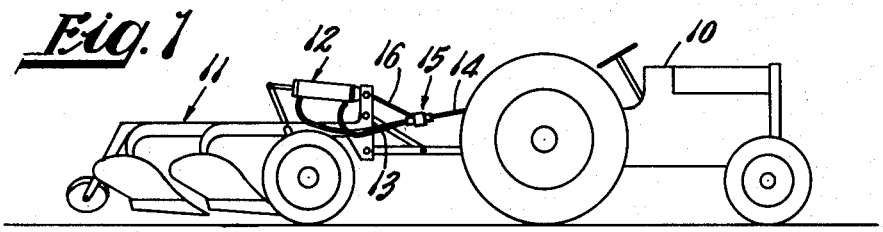
Fig. 1
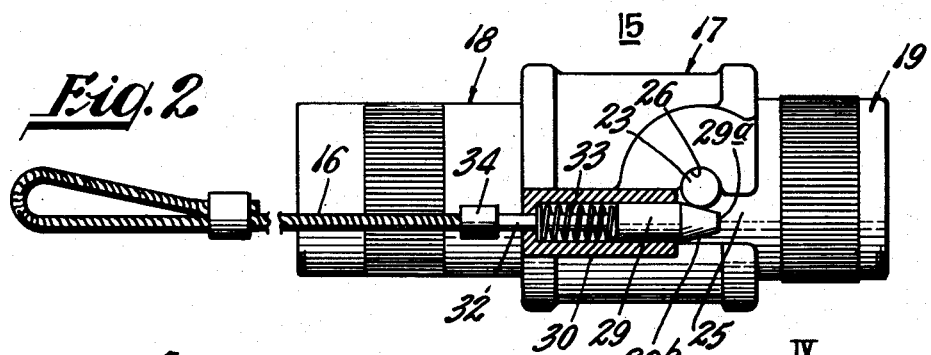
Fig. 2
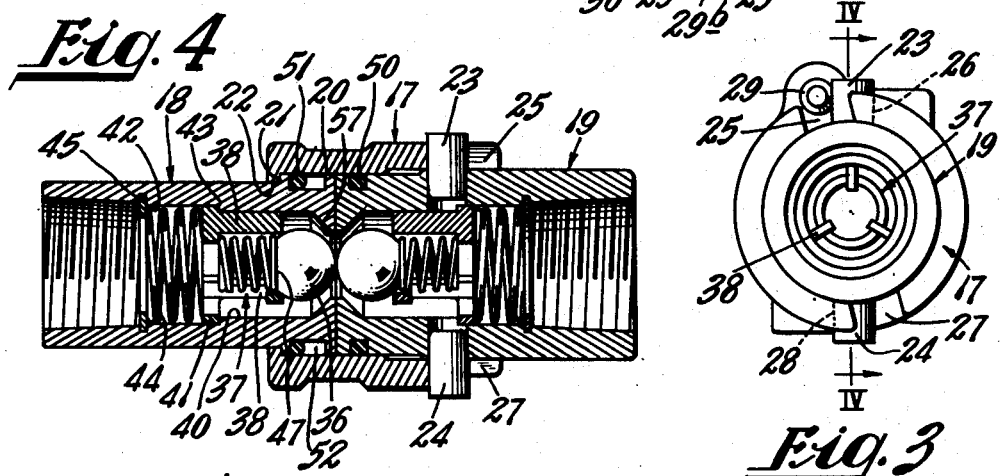
Fig. 4
Fig. 3
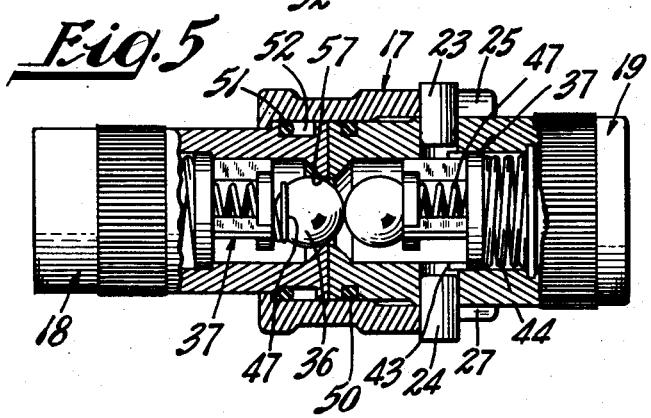
Fig. 5
INVENTOR
A. A. MEDDOCK
BY *Ell Woodbury*
ATTORNEY Nov. 24, 1953   A. A. MEDDOCK   2,660,456
AUTOMATIC QUICK DISCONNECT COUPLING
Filed Dec. 28, 1948                                   2 Sheets-Sheet 2

INVENTOR
A. A. MEDDOCK
BY *Ellwoodbury*
ATTORNEY

Patented Nov. 24, 1953

2,660,456

UNITED STATES PATENT OFFICE 2,660,456

AUTOMATIC QUICK DISCONNECT COUPLING

Alvin A. Meddock, Van Nuys, Calif., assignor to Bendix Aviation Corporation, South Bend, Ind., a corporation of Delaware Application December 28, 1948, Serial No. 67,625

1 Claim. (Cl. 284—18)

This invention relates to quick disconnect couplings for use particularly in flexible lines, and of the type in which both lines are automatically closed when the coupling is disconnected.

An object of the invention is to provide a simple, inexpensive and reliable disconnect coupling.

Another object is to provide a simple and reliable coupling that disconnects automatically in response to tension.

Another object is to provide a quick detachable coupling that can be connected and disconnected while high pressure is maintained in one connection.

Another object is to provide a quick disconnect coupling that is easily cleaned, whereby introduction of foreign matter into the fluid lines can be prevented.

Briefly, the present invention comprises a pair of fittings adapted to be abutted against each other in sealing relation, and having individual poppet valves therein which close the passages when the members are separated, but open the passages when the members are abutted together. The poppets are normally permitted to open only a limited distance, so that when the connection is made, each poppet moves away from its seat to clear the passage for flow of fluid in either direction. However, in accordance with the invention, provision is made for double movement of one poppet element so that if the coupling is made while pressure exists in one of the lines to be connected, the poppet associated with that line can remain in fully closed position while the connection is being made, the poppet in the other line receding beyond its normal position to permit the movement of the two connectors into abutting relation. Thereafter, when fluid pressure is built up in the second line to the pressure existing in the first line, the poppet in the first line is unseated, and the pressure in the two halves of the coupling is thereby equalized so that each poppet thereafter remains in its normal open position.

Another valuable feature of the invention is the use of a modified form of bayonet coupling which facilitates the ready locking and unlocking of the two sections of the coupling together. With a conventional bayonet coupling, the parts to be coupled have to be directly rotated to lock them together or release them. In contrast, in the present coupling, the two parts thereof can be released by simple actuation of a cam.

Still another feature is the provision of an expansible chamber into which air or fluid trapped between the two sections of the coupling can escape, thereby reducing the force required to move the sections into coupling engagement.

A complete understanding of the invention may be had from the following detailed description when read in connection with the drawing.

In the drawing:

Fig. 1 is a side elevational view showing an automatically releasable coupling in accordance with the invention in a hydraulic hose extending from a tractor to a drawn implement.

Fig. 2 is a side elevational view of the coupling of the invention, with the spring plunger housing of the bayonet lock shown in section to disclose the interior construction.

Fig. 3 is an end elevational view of the coupling, looking at the right end of Fig. 2.

Fig. 4 is a longitudinal section taken in the plane 4—4 of Fig. 3 and showing the valves of the coupling in open position.

Fig. 5 is a sectional view similar to Fig. 4 but showing the position of the valves when the coupling is made while high pressure exists in one of the lines.

Figure 6:
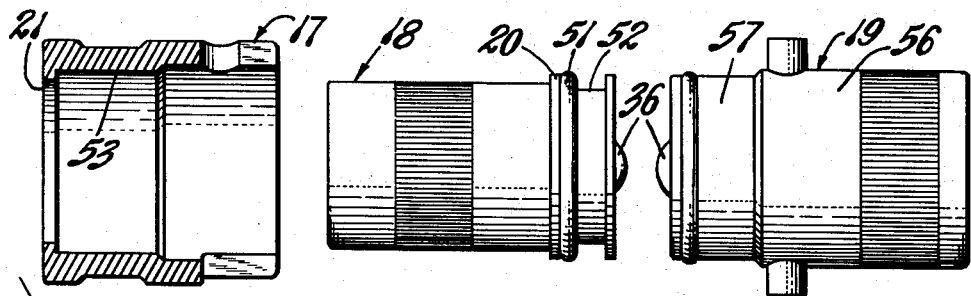
Fig. 6 is a view showing the essential parts of coupling separated.

Referring first to Fig. 1, there is shown a tractor 10 drawing a plow 11. The plow is equipped with a hydraulic lift including a jack 12 which is actuated by pressure fluid supplied from a pump (not shown) on the tractor 10 through a hose line consisting of a hose 13 that is permanently connected to the plow 11, and a hose 14 that is permanently connected to the tractor 10, the hoses 13 and 14 being interconnected by a coupling 15 in accordance with the present invention. The coupling 15 is mechanically connected to the plow 11 by a cable 16 and, as will appear later, the arrangement is such that if the drawbar connection between the plow and the tractor is broken and the latter moved away from the plow, the resultant tension applied to the coupling 15 by the cable 16 and the hose 14 causes the coupling to disconnect.

Referring to Figs. 2, 3 and 4, the coupling 15 comprises a sleeve 17 which is adapted to lock a pair of fittings 18 and 19 together with their front ends 55 in abutting relation. As clearly appears in Fig. 4, the outer surface of the fitting 19 is of uniform diameter dimensioned to fit snugly within the sleeve 17. The fitting 18 has an end portion 20 of the same external diameter as the fitting 19 but is of reduced diameter back of the end portion 20, defining a shoulder 21 against which a radially inwardly extending flange 22 on the sleeve 17 engages.

The fitting 19 has a pair of bayonet pins 23 and 24 projecting diametrically from opposite sides thereof, these pins being firmly pressed into apertures provided therefor in the fitting 19. The pins 23 and 24 are adapted to enter and be retained in bayonet slots in the sleeve 17. As best shown in Fig. 2, these bayonet slots in the fitting 15 each comprise an axially extending portion 25 having a lateral recess 26 in one side adjacent the bottom thereof. To connect the two fittings 18 and 19 together, the two pins 23 and 24 are aligned with the axially extending portions 25 and 27 of the bayonet slots in the sleeve 17, and the fitting 19 moved axially into the sleeves 17 as far as it will go and then rotated to engage the pins 23 and 24 in the laterally recessed portions 26 of the bayonet slots. Final twisting motion of the fitting 19 with respect to the sleeve 17 forces the pins 23 into the recess 26, to urge the end faces of the fittings 18 and 19 firmly together.

The fitting 19 is maintained in locked relation in the sleeve 17 by a spring-urged camming pin 29 which is mounted for slidable movement longitudinally in a housing 30 formed integrally with the sleeve 17. The camming pin 29 has an actuating rod 32 extending from the rear end thereof through the rear end of the housing 30, and a helical compression spring 33 surrounding the rod 32 and compressed between the rear end of the camming pin 29, and the rear end of the housing 30 yieldably urges the camming pin 29 outwardly.

During the connecting operation involving the insertion of the pin 23 axially into the slot 25, the pin 23 engages the right end of the camming pin 29 and depresses it, compressing spring 33 during this movement until the pin 23 begins to enter the lateral recess 26, whereupon the pin 23 slips past the end 29a and against a frustoconical camming surface 29b of the camming pin 29. The force of the spring 23 acting against the camming pin then becomes effective to urge the pin 23 fully into the lateral recess 26 and retain it therein against any force tending to separate the fittings 18 and 19.

However, when it is desired to separate the fittings this can be readily done by retracting the camming pin 29, and to this end the rod 32 is connected as by a ferrule 34 to the cable 16. When the camming pin 29 is retracted, there is nothing to prevent the pins 23 and 24 from pulling out of the recesses 26 and 28.

As shown in Fig. 1, the end of the cable 16 is connected to the plow 11 so that if the drawbar connection between the tractor 10 and the plow is broken, and the tractor is moved away from the plow, the resultant tension applied to the hose 14 and the cable 16 automatically retracts the camming pin 29 and permits the two fittings 18 and 19 of the coupling to separate.

Figure 7:
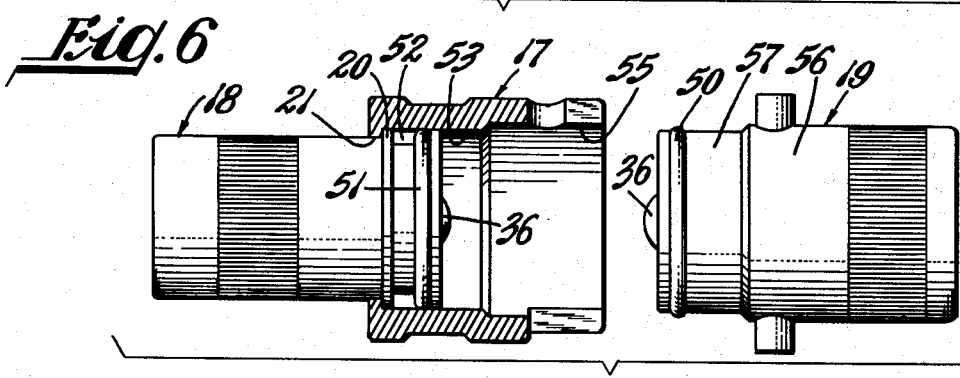
Fig. 7 is a view showing the first step in assembling the three separated parts of Fig. 6.
Figure 8:
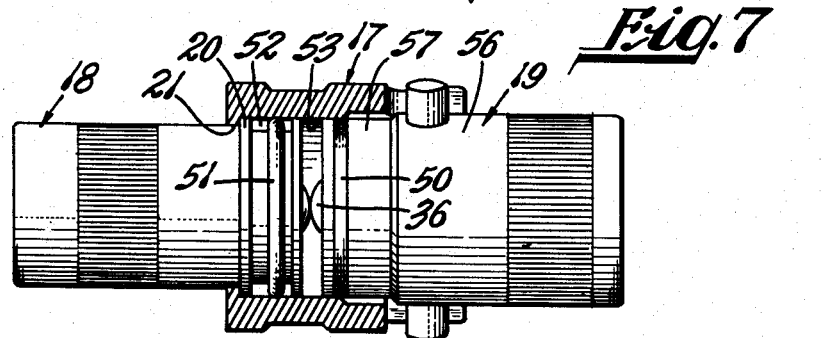
Fig. 8 is a view showing a second stage in the assembling of the three parts of the coupling.

The internal construction of the fittings 18 and 19 is clearly shown in Fig. 4. Both fittings are identical in internal construction and therefore the description of one applies to both. Thus, the fitting 18 has a poppet valve 36 which is adapted to seal against a seat 57 adjacent the front end of a longitudinal fluid passage 40 in the fitting when the fittings are separated and to be lifted off the seat by the corresponding poppet in the fitting 19 during normal operation when the fittings are connected together. Thus the two valves 36 have mutually cooperating portions in abutting relation and holding at least one of the valves in unseated position, as shown in Figs. 4 and 5. When the fittings 18 and 19 are separated, these portions of the valves 36 project through the seats 57 and beyond the front ends of the fittings, as shown in Figs. 6, 7 and 8. The poppet valve 36, as shown in Fig. 4, rests against valve movement resisting means comprising a valve-contacting portion 37 and a spring portion 44. The valve-contacting portion 37 consists of a stop element having three axially extending legs 38, the outer surfaces of which are cylindrical and are slidable within the passage 40 in the fitting 18. The axial legs 38 are joined at their rear ends to an annular element 41 which is slidable in a counterbore 42 in the fitting 18. The shoulder 43 at the junction of the passage 40 and the counterbore 42 limits forward movement of the stop element 37, and the latter is normally retained in forward position, in which the annular element 41 thereof lies against the shoulder 43, by the spring portion 44, consisting of a helical compression spring which is compressed between the base 41 of the stop elements 37 and a spring retaining ring 45 which is positioned in a groove provided therefor in the fitting 18 at the left end of the counterbore 42.

The poppet valve 36 is constantly urged toward its seat 57 by a relatively weak helical compression spring 47 which is guided within the axially extending legs 38 of the stop element and is compressed between the annular element 41 of the stop element and the valve 36.

The spring portion 44 of the valve movement resisting means in each of the fittings 18 and 19 is substantially stronger than the spring 47, so that if the two fittings 18 and 19 are pressed together when there is no fluid pressure in either fitting, neither of the springs 44 in the two fittings is composed, and each of the valves 36 is moved away from its seat substantially the same distance, as shown in Fig. 4.

However, let it be assumed that the two fittings 18 and 19 are connected while high pressure exists in one of the fittings, say the fitting 18. Referring to Fig. 5, the valve 36 of fitting 18 will be held against its seat 57 by the high pressure, so that only the valve in the fitting 19 can move. This valve first fully compresses its associated spring 47 until the valve rests against the stop element 37. Thereafter the stop element is moved, compressing the relatively heavy spring portion 44 sufficiently to permit the ends of the fittings 18 and 19 to abut each other and be locked together by the bayonet connection previously described. This leaves the fittings as shown in Fig. 5, in which the valve 36 in the fitting 18 is still seated by the pressure therein. The fitting will remain closed to fluid flow therethrough until the pressures in the two fittings are equalized, either by reducing the pressure in the fitting 18 or increasing the pressure in fitting 19. The usual procedure would be to increase the pressure in the fitting 19 until it approximately equals the pressure in the fitting 18, whereupon the pressure forces on the valve 36 in fitting 18 will be balanced, and the heavy spring portion 44 in fitting 19 becomes effective to move the associated stop element 37 to the left until it seats against the shoulder 43, this outward movement of the stop element functioning to move the valve in the fitting 18 off its seat into the position shown in Fig. 4, in which position the valve will remain until the connection is again broken.

To prevent the leakage between the fittings 18 and 19, the two fittings are provided with annular sealing rings 50 and 51 respectively of rubber or the like, which seal with the internal surface of the sleeve 17 when the fittings are forced together.

When the fittings 18 and 19 are disconnected from each other, the sleeve 17 can be retracted to the left completely off the fitting 18, thereby exposing all of the exterior surface of the latter for cleaning. All of the exterior surfaces of fitting 19 are similarly exposed for cleaning when the connection is broken. Furthermore, when the connection is broken, the outer ends of the fittings 18 and 19 present smooth surfaces substantially continuous with the exposed portions of the valves 36, so that all dirt and foreign matter can be readily wiped off.

Difficulty has been encountered in pressing the two fittings of a coupling of the general type so far described into final abutting relation, because of the trapping of fluid between the fittings and the sleeve. This difficulty cannot occur when one of the lines is open, but such condition often does not prevail. Thus when the coupling is used in a hydraulic line between a tractor and an implement, as shown in Fig. 1, it is a common condition at the time the hydraulic connection between the hoses 13 and 14 is completed by the coupling 15 and the remote ends of both of the lines to which the hoses 13 and 14 are connected are closed and the lines filled with liquid. There may be no pressure in one of the lines so that there is no particular resistance to depression of one of the ball valves 36. However, even though the ball valve is open, if the fitting and line connected thereto are filled with liquid, then any air trapped between the ends of the fittings must be compressed into the closed line to permit movement of the fittings into abutting relation with each other. This requires large coupling forces.

In accordance with the present invention, the foregoing difficulty is overcome by mounting one of the seals, such as the seal ring 51, in a relatively wide groove 52, the axial dimension of the groove being substantially greater than the axial dimension of the sealing ring 51, which is preferably of circular cross-section so that it rolls back and forth in the grooves 52. The manner in which the groove 52 and the sealing ring 51 operate to facilitate the connection of the coupling when both of the fluid lines are closed will be explained with reference to Figs. 6, 7, 8 and 9.

In Fig. 6 the sleeve 17 has been detached from both the fitting 18 and the fitting 19. In practice this detachment would be effected by sliding the fitting 17 to the left completely off the fitting 18. During this movement the friction of the inner surface 53 of the sleeve 17 against the sealing ring 51 rolls or slides the latter against the left wall of the groove 52. It is common to remove the sleeve 17 completely as shown in Fig. 6 to permit the wiping away of any dirt from the surface of the fittings 18 and 19.

The first step in reconnecting the coupling is to slide the sleeve 17 forwardly over the fitting 18 as far as it will go, that is, until the flange 21 on the left end of the sleeve 17 abuts against the flange 20 on the fitting 18. During this operation, the friction of the inner surface 53 of the sleeve 17 against the ring 51 rolls or slides the latter to the right end of the groove 52.

Figure 9:
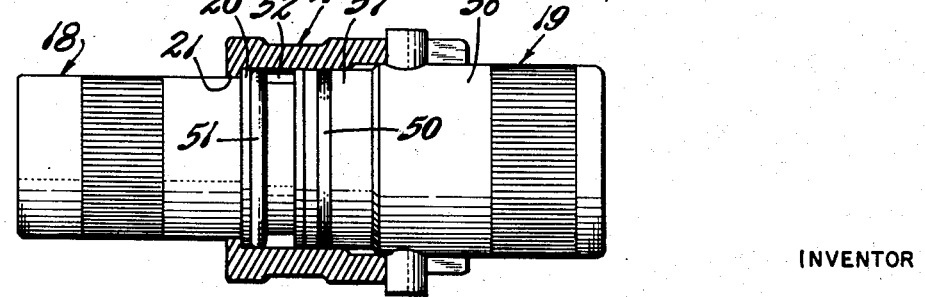
Fig. 9 is a view showing the final stage of coupling between the different parts.

The next and final step in completing the coupling is to insert the fitting 19 into the sleeve 17 and into abutting relation with the fitting 18. No difficulty is encountered in moving the fitting 19 into the sleeve 17 until the two valves 36 contact each other, and the seal 50 in the fitting 19 engages the inner sealing surface 53 of the sleeve 17, which traps fluid or air in the space between the ends of the fittings. However, during the movement from the position described, and illustrated in Fig. 8, into abutting position, as shown in Fig. 9, the air or fluid in the space between the ends of the fittings must be displaced. Of course, as previously indicated, if one of the fittings is connected to an open line, the trapped fluid can readily escape into that line as soon as the valve 36 begins to open. However, as further indicated, while one or both of the lines may not be under pressure they are usually filled with liquid and closed at the far ends so that the trapped fluid can be forced into the lines only by the exercise of substantial force. However, in accordance with the construction of the present invention, the trapped fluid in the space between the approaching ends of the fittings 18 and 19, as shown in Fig. 8, can escape into the wide groove 52, the round ring seal 51 being forced to the left in response to the fluid flow. The groove 52 is so dimensioned with respect to the space between the approaching ends of the fittings 18 and 19 at the time the balls 36 thereof contact, that when the ring 51 is forced to the extreme left side of the groove 52, the fittings are in abutting relation, as shown in Fig. 9.

To avoid trapping of an unnecessarily large quantity of fluid between the fittings 18 and 19, the length of the interior sealing surface 53 of the sleeve 17 is limited, the right end portion of the inner surface of the sleeve being counterbored to a larger diameter, as indicated at 55. To prevent rocking motion between the fitting 19 and the sleeve 18 when the coupling is completed, a rear portion 56 of the exterior surface of the fitting 19 is made of larger diameter than the extreme end portion 57. Thus the smaller end portion 57 is dimensioned to fit rather closely the interior surface 53 of fitting 18, whereas the outer portion 56 is dimensioned to fit the surface 55 of the sleeve 17.

Although for the purpose of explaining the invention, a particular embodiment thereof has been shown and described, obvious modifications will occur to a person skilled in the art, and I do not desire to be limited to the exact details shown and described.

I claim:

A device of the type described comprising: a pair of fittings having front ends and having longitudinal fluid passages therethrough; means detachably connecting said fittings with their front ends abutted together; each fitting having a valve seat in its passage adjacent the front end thereof; a poppet valve movably mounted in the passage in each fitting and seating on said valve seats when said fittings are separated; said valves having mutually cooperating portions in abutting engagement and holding at least one valve in unseated position, at least one of said portions projecting through said seat and beyond the front end of said fitting when said valves are seated and said fittings are separated; valve movement resisting means in each fitting, each resisting means comprising a valve-contacting portion and a spring portion urging said valve-contacting portion toward said valve; and limit means in said passage limiting movement of said valve-contacting portion toward said valve, said limit means being so spaced from said valve seat that when said valve is in said seated position said valve-contacting portion is spaced from said valve a distance equal to half the sum of the distances said two valves project beyond the front ends of their fittings.

ALVIN A. MEDDOCK.

References Cited in the file of this patent

UNITED STATES PATENTS

| Number | Name | Date |
|---|---|---|
| 1,871,370 | Jacques | Aug. 9, 1932 |
| 2,076,918 | Robison | Apr. 13, 1937 |
| 2,307,427 | Smith et al. | Jan. 5, 1943 |
| 2,405,864 | Vizay | Aug. 13, 1946 |
| 2,504,569 | Murphy | Apr. 18, 1950 |
| 2,516,743 | Allin | July 25, 1950 |

FOREIGN PATENTS

| Number | Country | Date |
|---|---|---|
| 340,638 | Germany | Sept. 14, 1921 |